(12) United States Patent
Allison et al.

(10) Patent No.: US 8,874,674 B2
(45) Date of Patent: Oct. 28, 2014

(54) SYSTEM FOR OPTIMIZING SOCIAL NETWORKING

(75) Inventors: Thayer S Allison, Charlotte, NC (US);
Timothy J. Bendel, Charlotte, NC (US);
David Joa, San Bruno, CA (US);
Yanghong Shao, Charlotte, NC (US);
David Neil Joffe, Charlotte, NC (US);
Naveen G. Yeri, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 281 days.

(21) Appl. No.: 13/486,816

(22) Filed: Jun. 1, 2012

(65) Prior Publication Data

US 2013/0325946 A1 Dec. 5, 2013

(51) Int. Cl.
*G06F 15/16* (2006.01)

(52) U.S. Cl.
USPC ........... 709/206; 709/203; 709/204; 709/217; 709/224

(58) Field of Classification Search
USPC ................. 709/203, 204, 206, 224, 217, 223; 705/14.1, 14.17
See application file for complete search history.

(56) References Cited

U.S. PATENT DOCUMENTS

| 7,792,727 | B2 | 9/2010 | Ghosh et al. | |
|---|---|---|---|---|
| 8,260,725 | B2 * | 9/2012 | Crawford | 709/203 |
| 8,566,197 | B2 * | 10/2013 | Satyavolu et al. | 705/14.1 |
| 2008/0189169 | A1 * | 8/2008 | Turpin et al. | 705/10 |
| 2009/0164400 | A1 * | 6/2009 | Amer-Yahia et al. | 706/45 |
| 2009/0164897 | A1 * | 6/2009 | Amer-Yahia et al. | 715/703 |
| 2009/0287687 | A1 * | 11/2009 | Martire et al. | 707/5 |
| 2010/0280892 | A1 * | 11/2010 | Uzunalioglu et al. | 705/14.13 |
| 2011/0246907 | A1 * | 10/2011 | Wang et al. | 709/224 |
| 2011/0320250 | A1 * | 12/2011 | Gemmell et al. | 705/14.1 |
| 2012/0066064 | A1 * | 3/2012 | Yoder et al. | 705/14.53 |
| 2012/0101881 | A1 * | 4/2012 | Taylor et al. | 705/14.13 |
| 2012/0191776 | A1 * | 7/2012 | Ruffner et al. | 709/204 |
| 2012/0215597 | A1 * | 8/2012 | Ross | 705/14.1 |
| 2012/0215610 | A1 * | 8/2012 | Amaro et al. | 705/14.23 |
| 2012/0221505 | A1 * | 8/2012 | Evans et al. | 706/52 |
| 2012/0239466 | A1 * | 9/2012 | Hu et al. | 705/14.1 |
| 2012/0253918 | A1 * | 10/2012 | Marois et al. | 705/14.39 |
| 2012/0271691 | A1 * | 10/2012 | Hammad et al. | 705/14.17 |
| 2013/0018982 | A1 * | 1/2013 | McConnell et al. | 709/217 |
| 2013/0054334 | A1 * | 2/2013 | Ross et al. | 705/14.25 |

* cited by examiner

*Primary Examiner* — Ramy M Osman

(74) *Attorney, Agent, or Firm* — Michael A. Springs; Moore and Van Allen, PLLC; Tracea L. Rice

(57) ABSTRACT

Systems, methods and computer program products are provided for optimizing social networks. In the systems and methods, account data associated with a user account is received and the account data is stored in a storage device. Pluralities of networking opportunities are identified based on the account data. Furthermore, based on the account data triggers may be detected indicating a user's interest in one or more social networking opportunities. The system then offers the user, based at least partially on the detected trigger, the one or more social networking opportunities.

21 Claims, 11 Drawing Sheets

ISSUE TRACKING TABLE

| Date | Week Day | Trigger | Frequency | LCL | Count | UCL | Alert Type | Action |
|---|---|---|---|---|---|---|---|---|
| 1-Dec | Thurs | Trigger-1 | Daily | 45831 | 104860 | 87014 | Outlier | Supress |
| 1-Dec | Thurs | Trigger-2 | Daily | 76 | 77 | 172 | Normal | |
| 2-Dec | Fri | Trigger-1 | Daily | 87759 | 81205 | 159389 | Outlier | Supress |
| 2-Dec | Fri | Trigger-2 | Daily | 1259 | 1269 | 1658 | Normal | |
| 3-Dec | Sat | Trigger-1 | Daily | 0 | 0 | 0 | | |
| 3-Dec | Sat | Trigger-2 | Daily | 0 | 0 | 0 | | |
| 4-Dec | Sun | Trigger-1 | Daily | 0 | 0 | 0 | | |
| 4-Dec | Sun | Trigger-2 | Daily | 0 | 0 | 0 | | |
| 5-Dec | Mon | Trigger-1 | Daily | 86843 | 107066 | 157455 | Normal | |
| 5-Dec | Mon | Trigger-2 | Daily | 44 | 104 | 113 | Normal | |
| 6-Dec | Tues | Trigger-1 | Daily | 53464 | 60214 | 111612 | Normal | |
| 6-Dec | Tues | Trigger-2 | Daily | 56 | 248 | 100 | Outlier | Supress |
| 7-Dec | Wed | Trigger-1 | Daily | 47692 | 53416 | 77858 | Normal | |
| 7-Dec | Wed | Trigger-3 | Daily | 23267 | 31138 | 44186 | Normal | |
| 7-Dec | Wed | Trigger-2 | Daily | 44 | 30 | 84 | Outlier | Supress |
| 8-Dec | Thurs | Trigger-1 | Daily | 47874 | 56286 | 81416 | Normal | |
| 8-Dec | Thurs | Trigger-3 | Daily | 23267 | 28823 | 44186 | Normal | |
| 8-Dec | Thurs | Trigger-2 | Daily | 76 | 112 | 172 | Normal | |
| 9-Dec | Fri | Trigger-1 | Daily | 84956 | 89824 | 156820 | Normal | |
| 9-Dec | Fri | Trigger-3 | Daily | 23267 | 30382 | 44186 | Normal | |
| 9-Dec | Fri | Trigger-2 | Daily | 1259 | 1646 | 1658 | Normal | |
| 10-Dec | Sat | Trigger-1 | Daily | 0 | 0 | 0 | | |

*FIG. 7B*

SYSTEM FOR OPTIMIZING SOCIAL NETWORKING

BACKGROUND

People often find it difficult to network outside of their places of business, school, and extra-curricular activities. As such, there are vast amounts of networking connections that can be made if people had alternative means for identifying their common interest with other individuals in their area. Moreover, financial institutions are often facilitating marketing and customer offers for major corporations but do little to facilitate networking amongst the customers themselves. Inasmuch, the customer may find themselves limited in terms of ways to branch out and make new networking connections. Existing social networking sites focus on some social groups but leave it up to the individual to identify themselves as being a member or having interest in a particular social group. To this extent, a method is needed for identifying social networking opportunities amongst individual in a common area such that a system may facilitate contact exchange and provide information about social networking opportunities to individuals with little to no input from the individual themselves.

BRIEF SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Methods, systems and computer program products are defined that provide for an automated bill pay system. A system and method provide for embodiments of the claimed invention. The system includes a non-transitory computer-readable storage medium including computer-readable program code, and a processor coupled to the computer readable storage medium and configured to execute the computer readable program code. In accordance with embodiments herein disclosed, the system may receive account data associated with a plurality of user accounts. The system may then identify one or more social networking opportunities, based on the account data. Additionally, the system may detect a trigger based on the account data. In one embodiment, the trigger may indicate a user's interest in the one or more social networking opportunities. The system may then offer the user one or more social networking opportunities based at least partially on the detected trigger.

According to one embodiment of the invention the system may determine demographic information associated with the plurality of user's based on the account data. In such an embodiment, the system may be further configured to offer the user one or more networking opportunities based at least partially on the detected trigger and the demographic information.

According to another embodiment of the invention the system may create a social networking site based at least partially on the one or more identified social networking opportunities. In one embodiment, the social networking site facilitates the exchange of user contact information. In such an embodiment, the system may also offer the user an invitation to the social networking site. Furthermore, in such an embodiment, the system may receive consent from the user to post user contact information on the social networking site.

According to yet another embodiment of the invention the system may receive one or more requirements from a social network. In such an embodiment, the plurality of users may not be offered the social networking opportunity until the one or more requirements have been met. In one embodiment, the system may analyze the plurality of user accounts and identify common transactions in the plurality of user accounts.

A further embodiment of invention is defined by a computer program product that includes a computer-readable medium. The computer-readable medium includes a first program code portion operable to receive account data associated with a plurality of user accounts. The computer-readable medium additionally includes a second program code portion operable to identify one or more social networking opportunities based on the account data. The computer-readable medium additionally includes a third program code portion operable to detect a trigger based on the account data. In one embodiment, the trigger may indicate a user's interest in the one or more social networking opportunities. The computer-readable medium additionally includes a fourth program code portion operable to offer the user, based at least partially on the detected trigger, one or more social networking opportunities.

In further optional embodiments of the invention, the medium may additionally include a fifth program code portion operable to determine demographic information associated with the plurality of user's based on the account data. In one embodiment, the fifth program code portion is further operable to offer the user one or more networking opportunities based at least partially on the detected trigger and the determined demographic information.

In further optional embodiments of the invention, the medium may additionally include a fifth program code portion operable to create a social networking site based at least partially on the one or more identified social networking opportunities. In one embodiment, the social networking site may facilitate the exchange of user contact information. In such an embodiment, the fifth program code portion may further operable to offer the user an invitation to the social networking site. Additionally, in such an embodiment, the fifth program code portion is further operable to receive consent from the user to post user contact information on the social networking site.

In further optional embodiments of the invention, the medium may additionally include a fifth program code portion operable to receive one or more requirements from a social network such that the plurality of users may not be offered the social networking opportunity until the one or more requirements have been met. In further optional embodiments of the invention, the medium may additionally include a fifth program code portion operable to analyze the plurality of user accounts and identify common transactions in the plurality of user accounts.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE SEVERAL VIEWS OF THE DRAWINGS

The present embodiments are further described in the detailed description which follows in reference to the noted plurality of drawings by way of non-limiting examples of embodiments of the present embodiments in which like reference numerals represent similar parts throughout the several views of the drawings and wherein:

FIG. 7B provides a table illustrating trigger data quality monitoring in accordance with various embodiments of the invention;

DETAILED DESCRIPTION

Figure 1:
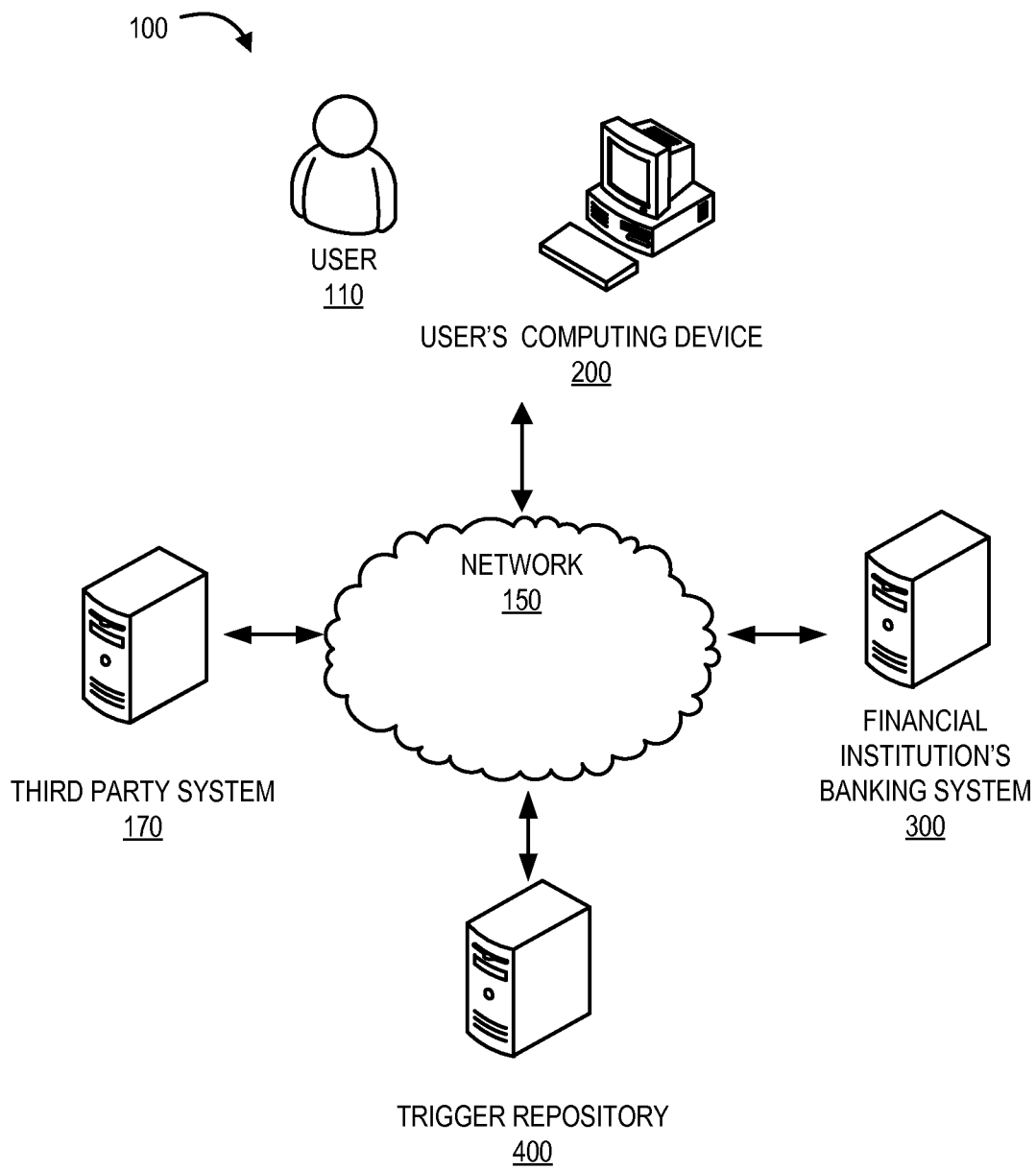
FIG. 1 provides a block diagram illustrating a trigger analysis system and environment in accordance with various embodiments of the invention.

The embodiments presented herein are directed to systems and methods for enhancing and maintaining customer relationships with an organization by the creation, institution, and management of account related triggers. In some embodiments, a system that supports ideation, sizing, design, production, and maintenance of triggers is provided. The system develops effective communication routines to aid in trigger delivery. Other embodiments are directed to monitoring data quality by checking historical volume and calculating high and low control limits to determine whether current volumes are in control. Such data quality monitoring minimizes false positives.

Other embodiments are directed to retaining users in their existing relationships with a financial institution. Based on account data, comparisons of past and current transactional activity are made and a slowdown in account usage is determined. In response to the determination, notifications are presented to the user to increase customer satisfaction and retain the customer relationship. Financial institutions find this approach desirable because it is more cost effective and profitable to retain existing relationships than it is to acquire new customers.

Still other embodiments are directed to increasing transactional depth or account breadth. Incoming and outgoing transactions are evaluated over a period of time to identify accounts that are close to a certain threshold. Users are notified of their account status and prompted to increase account activity in order to gain extra benefits. In this way, financial institutions are able to understand their customers' needs and cross sell products. In further embodiments, the relationship with the user is enhanced by timely identifying outside transactions through account review. For example, withdrawals, opening new accounts with a competitor, or making competitor payments are identified and reviewed to avoid losing the user to a competitor.

Further embodiments focus on providing new products to a user by identifying inbound and outbound transactions that signify a change in account activity or relate to a particular type of transaction. Triggers related to payment types and increases in deposit amounts are identified to enable a financial institution to cross sell products to users.

In other embodiments, account information is reviewed to identify accounts that have unavailable funds and fixed costs and users are presented policy information. In this way, users are educated to avoid fixed costs and are made away of available options so that they can make informed decisions.

As will be appreciated by one skilled in the art, aspects of the present embodiments of the invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the invention are described below with reference to flowchart illustrations and/or block diagrams of methods, apparatus (systems) and computer program products according to embodiments of the embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As presented herein, embodiments that enhance and maintain customer relationships with a financial institution via financial account related triggers are provided. As used herein, the term "trigger" refers to, but is not limited to, account activity, transactional data, account costs, and account terms and conditions associated with one or more financial accounts. Exemplary triggers include transactions and/or events associated with various accounts, such as a checking account, savings account, credit card account, retirement account, investment vehicle, or other type of account. Specific events or trends in account activity are used to accomplish various objectives in the support and maintenance of user accounts to thereby increase user satisfaction and account profitability.

Referring now to the figures, FIG. 1 provides a block diagram illustrating a trigger analysis system and environment 100, in accordance with an embodiment of the invention. The trigger analysis environment 100 includes a user 110, and an associated computing device 200. A user of the system may be an individual account holder, an agent of the account holder, a customer of a financial institution, or any other entity that is capable of maintaining a financial account. The computing device 200 may be any device that employs a processor and memory and can perform computing functions, such as a personal computer or a mobile device. As used herein, a "mobile device" is any mobile communication device, such as a cellular telecommunications device (i.e., a cell phone or mobile phone), personal digital assistant (PDA), a mobile Internet accessing device, or other mobile device.

The computing device 200 is configured to communicate over a network 150 with a financial institution's banking system 300 and, in some cases, a third party system 170, such as one or more other financial institution systems, a vendor's system, a POS (point of sales) device, and the like. The user's computing device 200, the financial institution's banking system 300, and a trigger repository 400 are each described in greater detail below with reference to FIGS. 2-4. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

In general, the computing device 200 is configured to connect with the network 150 to log the user 110 into the financial institution's banking system 300, such as an online banking system. The banking system 300 involves authentication of a user in order to access the user's account on the banking system 300. For example, the banking system 300 is a system where a user 110 logs into his/her account such that the user 110 or other entity can access data that is associated with the user 110. For example, in one embodiment of the invention, the banking system 300 is an online banking system maintained by a financial institution. In such an embodiment, the user 110 can use the computing device 200 to log into the banking system 300 to access the user's online banking account. Logging into the banking system 300 generally requires that the user 110 authenticate his/her identity using a user name, a passcode, a cookie, a biometric identifier, a private key, a token, and/or another authentication mechanism that is provided by the user 110 to the banking system 300 via the computing device 200. The financial institution's banking system 300 is in network communication with other devices, such as the third party system 170 and the trigger repository 400.

In some embodiments of the invention, the trigger repository 400 is configured to be controlled and managed by one or more third-party data providers (not shown in FIG. 1) over the network 150. In other embodiments, the trigger repository 400 is configured to be controlled and managed over the network 150 by the same entity that maintains the financial institution's banking system 300. In other embodiments, the trigger repository 400 is configured to be controlled and managed over the network 150 by the financial institution implementing the trigger system of the present embodiments of the invention. In still other embodiments, the trigger repository 400 is a part of the banking system 300.

Figure 2:
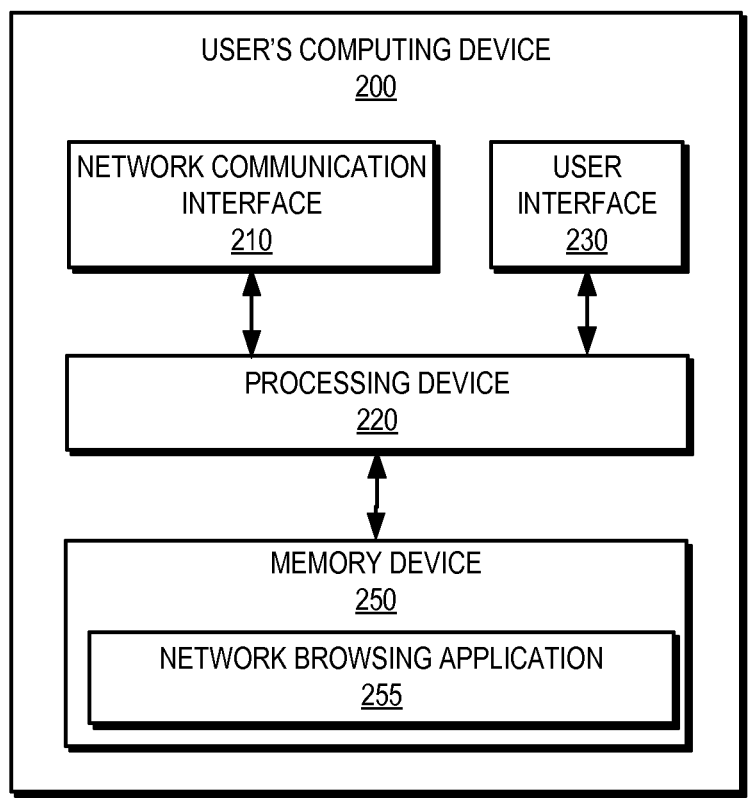
FIG. 2 provides a block diagram illustrating the user's computing device of FIG. 1, in accordance with various embodiments of the invention.

Referring now to FIG. 2, the computing device 200 associated with the user 110 includes various features, such as a network communication interface 210, a processing device 220, a user interface 230, and a memory device 150. The network communication interface 210 includes a device that allows the computing device 200 to communicate over the network 150 (shown in FIG. 1). In addition, a network browsing application 255 is stored in the memory device 250. The network browsing application 255 provides for the user to establish network communication with the banking system 300 (shown in FIG. 1) for the purpose of communicating account information to the banking system 300, in accordance with embodiments of the present embodiments of the invention.

As used herein, a "processing device," such as the processing device 220 or the processing device 320, generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 220 or 320 may further include functionality to operate one or more software programs based on computer-executable program code thereof, which may be stored in a memory. As the phrase is used herein, a processing device 220 or 320 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "user interface" 230 generally includes a plurality of interface devices that allow a customer to input commands and data to direct the processing device to execute instructions. As such, the user interface 230 employs certain input and output devices to input data received from the user 110 or output data to the user 110. These input and output devices may include a display, mouse, keyboard, button, touchpad, touch screen, microphone, speaker, LED, light, joystick, switch, buzzer, bell, and/or other customer input/output device for communicating with one or more customers.

As used herein, a "memory device" 250 or 350 generally refers to a device or combination of devices that store one or more forms of computer-readable media and/or computer-executable program code/instructions. Computer-readable media is defined in greater detail below. For example, in one embodiment, the memory device 250 or 350 includes any computer memory that provides an actual or virtual space to temporarily or permanently store data and/or commands provided to the processing device 220 when it carries out its functions described herein.

Figure 3:
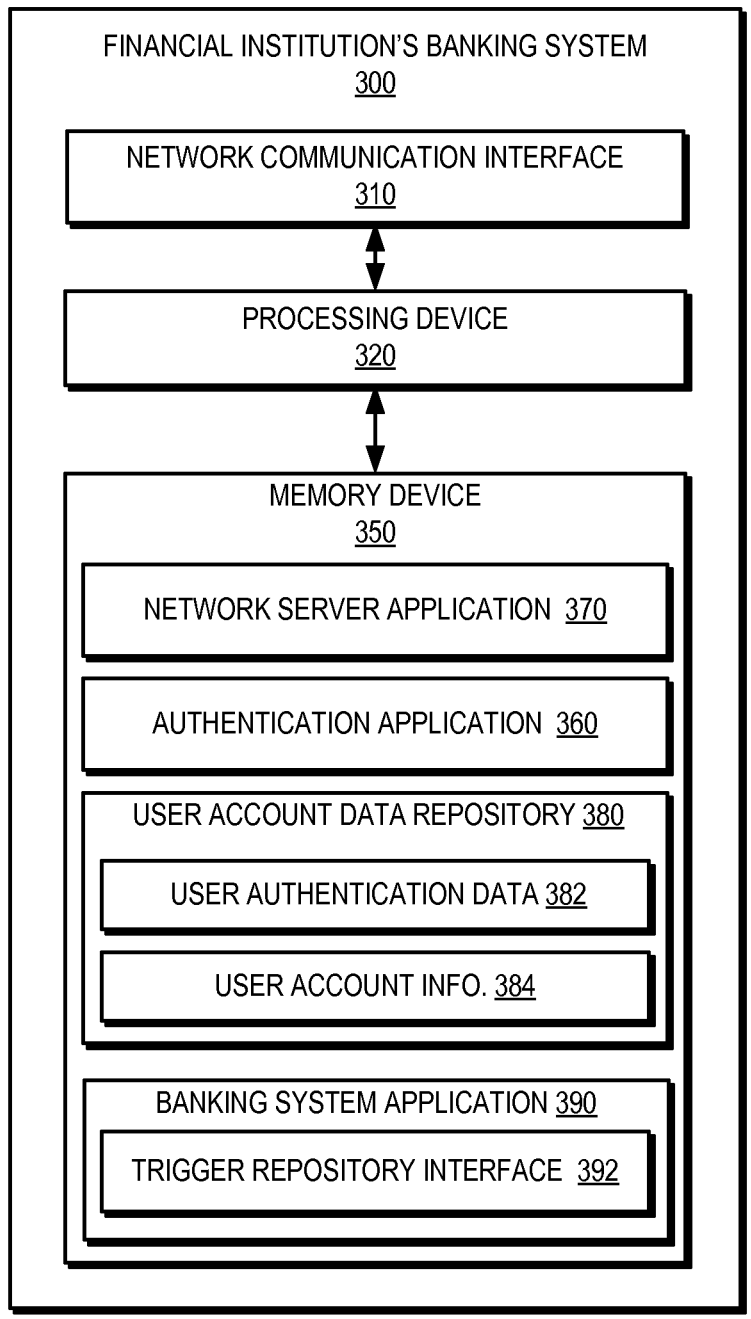
FIG. 3 provides a block diagram illustrating the financial institution's banking system of FIG. 1, in accordance with various embodiments of the invention.

FIG. 3 provides a block diagram illustrating the banking system 300 in greater detail, in accordance with embodiments of the invention. In one embodiment of the invention, the banking system 300 includes a processing device 320 operatively coupled to a network communication interface 310 and a memory device 350. In certain embodiments, the banking system 300 is operated by a first entity, such as a financial institution, while in other embodiments, the banking system 300 is operated by an entity other than a financial institution.

It should be understood that the memory device 350 may include one or more databases or other data structures/repositories. The memory device 350 also includes computer-executable program code that instructs the processing device 320 to operate the network communication interface 310 to perform certain communication functions of the banking system 300 described herein. For example, in one embodiment of the banking system 300, the memory device 350 includes, but is not limited to, a network server application 370, an authentication application 360, a user account data repository 380, which includes user authentication data 382 and user account information 384, and a banking application 390, which includes a trigger repository interface 392 and other computer-executable instructions or other data such as a trigger software module. The computer-executable program code of the network server application 370, the authentication application 360, or the banking system application 390 may instruct the processing device 320 to perform certain logic, data-processing, and data-storing functions of the online system described herein, as well as communication functions of the banking system 300.

In one embodiment, the user account data repository 380 includes user authentication data 382 and user account information 384. The network server application 370, the authentication application 360, and the banking system application 390 are configured to implement user account information 384 and the trigger repository interface 392 when monitoring the trigger data associated with a user account. The banking system application 390 includes a trigger software module for performing the steps of methods 500-700.

As used herein, a "communication interface" generally includes a modem, server, transceiver, and/or other device for communicating with other devices on a network, and/or a user interface for communicating with one or more customers. Referring again to FIG. 3, the network communication interface 310 is a communication interface having one or more communication devices configured to communicate with one or more other devices on the network 150, such as the personal computing device 200, the banking system 300, the third party system 170, and the trigger repository 400. The processing device 320 is configured to use the network communication interface 310 to transmit and/or receive data and/or commands to and/or from the other devices connected to the network 150.

Figure 4:
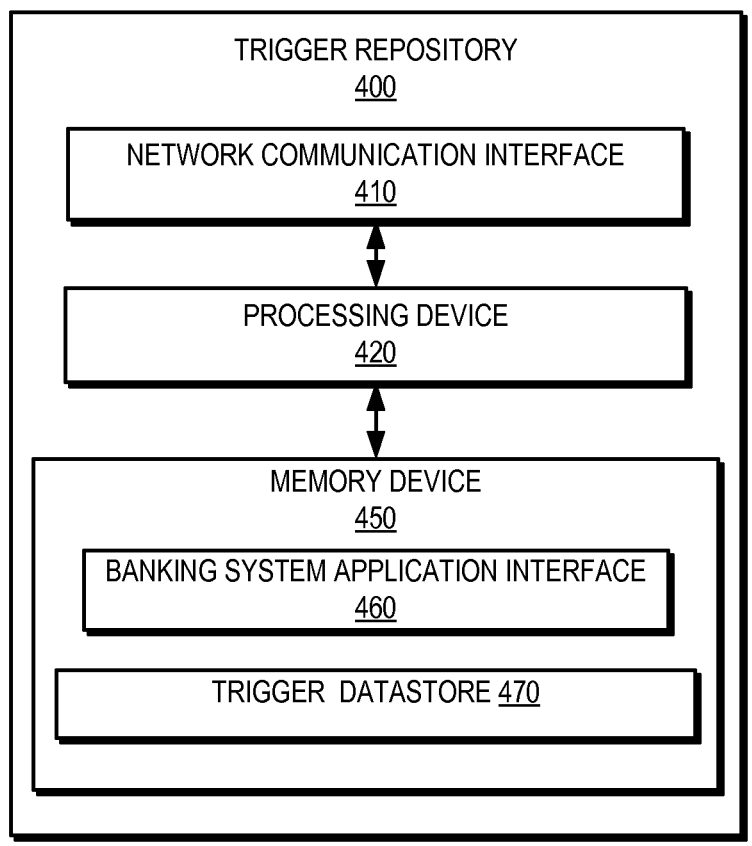
FIG. 4 provides a block diagram illustrating the trigger repository of FIG. 1, in accordance with various embodiments of the invention.

FIG. 4 provides a block diagram illustrating the trigger repository 400, in accordance with an embodiment of the invention. In one embodiment of the invention, the trigger repository 400 is operated by a second entity that is a different or separate entity from the first entity (e.g., the financial institution) that, in one embodiment of the invention, implements the banking system 300. In one embodiment, the trigger repository 400 could be part of the banking system 300. In another embodiment, the trigger repository 400 is a distinct entity from the banking system 300. As illustrated in FIG. 4, the trigger repository 400 generally includes, but is not limited to, a network communication interface 410, a processing device 420, and a memory device 450. The processing device 420 is operatively coupled to the network communication interface 410 and the memory device 450. In one embodiment of the trigger repository 400, the memory device 450 stores, but is not limited to, a banking system interface 460 and a trigger data store 470. The trigger data store 470 stores data including, but not limited to, triggers, account activity, including transaction and account costs for the user's financial institution account, other trigger related data, and mobile number or email address for the user's 110 account. In one embodiment of the invention, both the banking system interface 460 and the trigger data store 470 may associate with applications having computer-executable program code that instructs the processing device 420 to operate the network communication interface 410 to perform certain communication functions involving the trigger data store 470 described herein. In one embodiment, the computer-executable program code of an application associated with the trigger data store 470 may also instruct the processing device 420 to perform certain logic, data processing, and data storing functions of the application associated with the trigger data store 470 described herein. A trigger, as defined herein, is not limited to account activity, and may further include costs, policies, and conditions associated with an account.

The network communication interface 410 is a communication interface having one or more communication devices configured to communicate with one or more other devices on the network 150. The processing device 420 is configured to use the network communication interface 410 to receive information from and/or provide information and commands to the user's computing device 200, the third party system 170, the trigger repository 400, the banking system 300 and/or other devices via the network 150. In some embodiments, the processing device 420 also uses the network communication interface 410 to access other devices on the network 150, such as one or more web servers of one or more third-party data providers. In some embodiments, one or more of the devices described herein may be operated by a second entity so that the third-party controls the various functions involving the trigger repository 400. For example, in one embodiment of the invention, although the banking system 300 is operated by a first entity (e.g., a financial institution), a second entity operates the trigger repository 400 that stores the trigger details for the customer's financial institution accounts and other information about users.

As described above, the processing device 420 is configured to use the network communication interface 410 to gather data from the various data sources. The processing device 420 stores the data that it receives in the memory device 450. In this regard, in one embodiment of the invention, the memory device 450 includes data stores that include, for example: (1) triggers associated with a user's financial institution account numbers and routing information, (2) information about sending and receiving users' mobile device numbers, email addresses, or other contact information, which may have been received from the banking system 300.

Turning now to the production of triggers, in some embodiments, trigger ideas are formulated and undergo a preliminary review. The ideas may be formulated internally, such as by a team of analysts of a financial institution, or the ideas may be formulated externally by segment, channel, and marketing partners of a financial institution. The ideas are prioritized based on an opportunity analysis. For example, transaction channels, transaction categories, business names, amount thresholds, stability, and violation frequencies are selected to determine and quantify opportunities that can be generated from the trigger ideas. These opportunities, such as customer retention and policy education, may be analyzed in view of preferred, retail, and small business demographics. Based on the opportunity review, triggers are developed through rigorous testing. For example, tests may be conducted on transactions associated with a specific account or user. Further, triggers that are similar in scope and that overlap over the same time period may be monitored to further develop the trigger. The results of the testing may then be reviewed to finalize the triggers. In some embodiments, the triggers are modified for automation. For example, the code for automating the triggers may be embellished and specific parameters provided. In further embodiments, the automated triggers are monitored. For example, content and process quality trigger checks can be run on a daily, weekly, bi-weekly, and/or monthly basis.

Figure 5A:
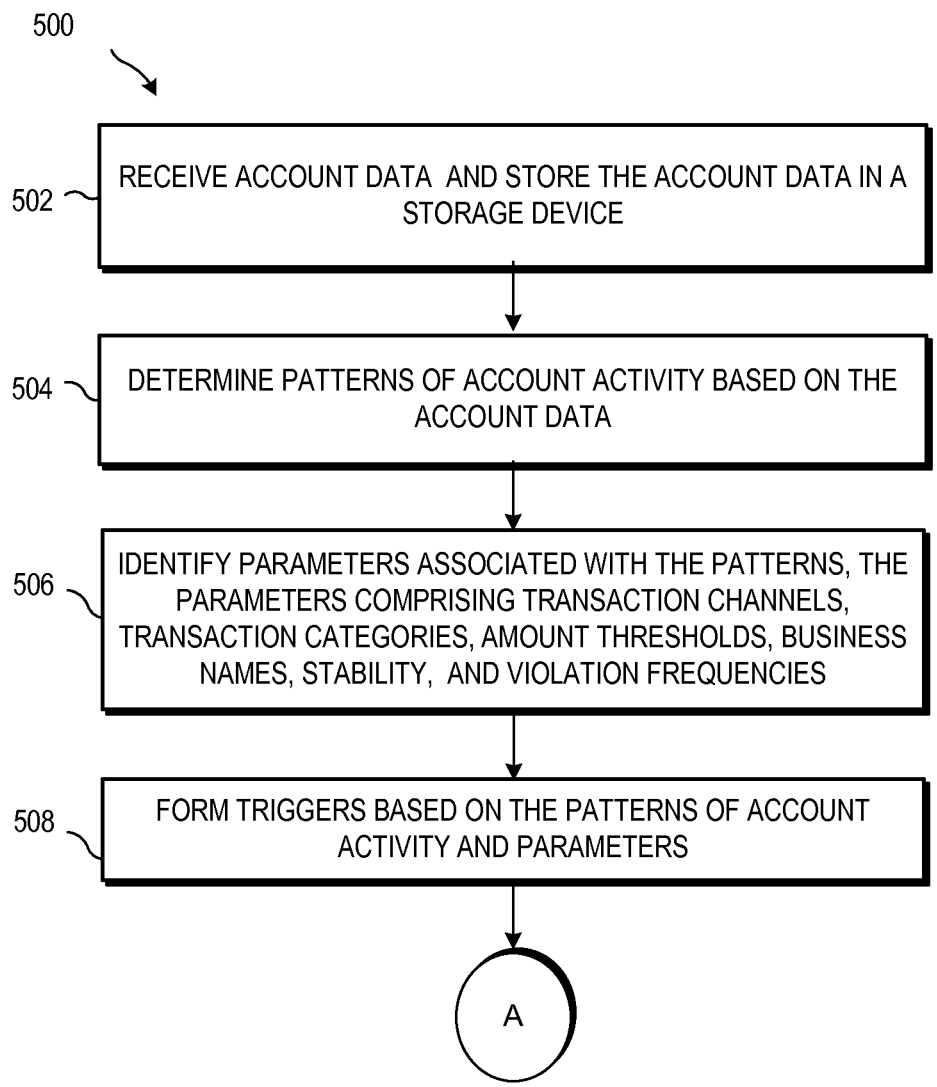
FIGS. 5A-5B are flowcharts illustrating a system and method for producing and maintaining triggers in accordance with various embodiments of the invention.
Figure 5B:
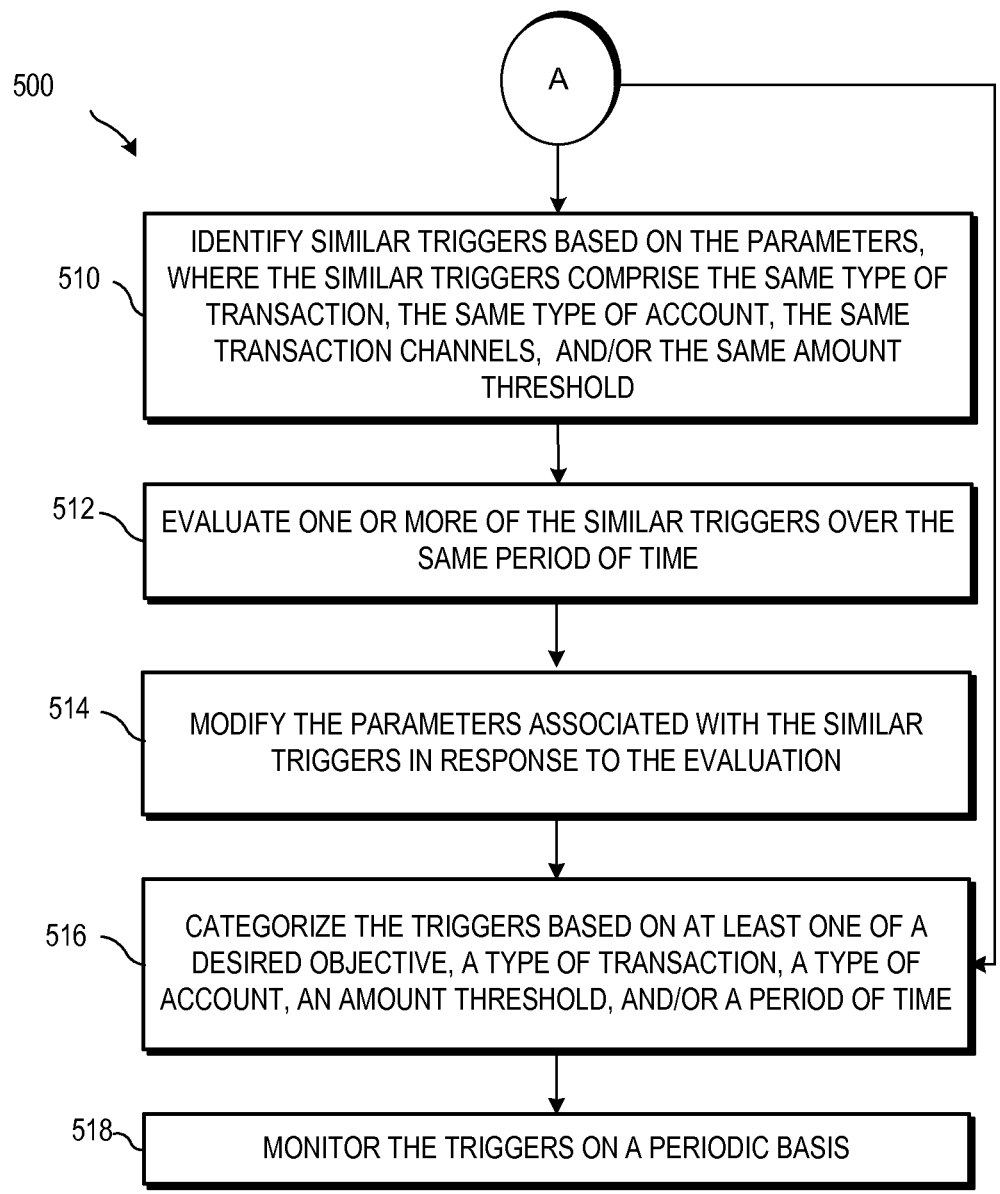

FIGS. 5A-5B are flowcharts providing an overview of a system and method 500 for producing and maintaining triggers. One or more devices, such as one or more mobile device and/or one or more other computing devices and/or servers, can be configured to perform one or more steps of the method 500, as well as the methods 600 and 800. In some embodiments, the one or more devices performing the steps are associated with a financial institution. In other embodiments, the one or more devices performing the steps are associated with a business, partner, third party, and/or user.

As shown in FIG. 5A, at block 502, account data is received and stored in a storage device. A used herein, "account data" includes, but is not limited to any data associated with one or more financial accounts such as transaction amounts, inbound transactions, outbound transactions, transaction channels, transaction categories, transaction dates, identification of third parties to a transaction, payee names, purpose of transactions, transaction transfer data, types of accounts, costs associated with the account, account balances, and the like. The account data may be received from the user, merchants, other financial institutions such as credit card companies, or any other entity.

In block 504, patterns of account activity are determined based on the account data. The account activity, in some embodiments, is specifically linked to a transaction category, transaction type, transaction amount, or transaction channel. For example, algorithms may be used to detect upward or downward trends in the number of transactions, the amount of transactions, the occurrence of account costs, or other account activity over a period of time. Deposit amounts for a particular account, for example, may increase during the month of April for several years in a row and provide an indication that the account user has received a tax refund.

In block 506, parameters associated with the patterns are identified, where the parameters include transaction channels, transaction categories, amount thresholds, business names, stability, and violation frequencies. The parameters are identified, in some embodiments, by using algorithms, keywords, Boolean, transaction channel codes, transaction amount calculations and threshold amounts to search the account data related to the patterns of account activity. The keywords include business names, merchant names, third party financial institution names, transaction dates, transaction amounts, user identification, account identification, and the like.

Transaction channels include transaction processes such as electronic funds transfers, automatic deposits and withdrawals, ATM withdrawals and deposits, point-of-sale (POS) purchases, and the like. For example, triggers directed to deposit transactions may include transaction channel parameter such as teller deposits, ATM deposits, ACH deposits, internal transfers, automatic transfers, and pay roll transfers.

Transaction categories include transactions that are grouped according to a desired outcome or purpose. Exemplary transaction categories include providing networking opportunities to users, user retention, increasing a user's transactional depth or account breadth, timely identification of outside transactions, new products, risk mitigation, policy education, and the like.

The amount thresholds include predetermined amounts associated with one or more transactions such as minimum and/or maximum percent, total, average, or median limits for quantities or values associated with one or more transactions. For example, some parameters may require that all purchases be over a minimum $100 limit and/or under a $10,000 limit. The stability parameters provide an indication of transactions that perform consistently over time, or an indication of transactions that have been adjusted to remove variations in activity over time. For example, the stability parameters may include a range of percentages, ratios, transaction amounts, and frequencies that fall within specific tolerances and that are linked to specific transactions that are tracked over time. Parameters of violation frequencies indicate the frequency of outliers, unexpected events, and negative results in account activity. For example, if the number of ATM withdrawals for a particular account has gradually decreased from six per month to one per month over the last seven months, seven ATM withdrawals on the same day of the current month would indicate a reversal in the trend and would be a violation of the trigger. The violation frequency can indicate an isolated occurrence which can be deleted or ignored from the data, or it can indicate a negative trend. Based on the violation frequency, the parameters of the triggers can be adjusted accordingly.

In block 508, triggers are formed based on the patterns of account activity and the parameters. In some embodiments, the patterns of account activity and the parameters are used to define the triggers. For example, a trigger may be defined by the total monthly number of ATM deposits that occur over a three month period. Further, the patterns of account activity provide the expected trend for transactions defined by the parameters. In the previous example, the trigger may be further defined by requiring that the total monthly number of ATM deposits decrease over the three month period. The patterns of account activity and parameters selected for each trigger may be based on the objective of the trigger. Triggers directed to cross selling investment products to user, for example, may include a pattern of increasing direct deposits in a saving account over a two week period. The triggers, and the patterns and parameters that define the triggers, may take on any number of variations.

The method 500 is further illustrated in FIG. 5B. In block 510, similar triggers are identified based on the parameters, where the similar triggers comprise the same type of transaction, the same type of account, the same transaction channels, and/or the same amount threshold. In some embodiments, the similar triggers are associated with one or more accounts and/or one or more users. The similar triggers can be associated with a single account or user, or multiple accounts of the same or different users. For example, a similar trigger may include all payment transactions associated with a particular user, where the payment transactions include use of a credit card, a checking account, or other account. In further embodiments, the similar triggers are identified based on a transaction category.

In block 512, one or more of the similar triggers are evaluated over the same period of time. The evaluation of the similar triggers over the same time periods strengthens the trigger data such that any potential flaws, improvements, or strengths in the data are highlighted. In one example, electronic fund transfers associated with multiple accounts are monitored every day over the same six month period. In this way, the number of times the trigger should be run in a week or month, the days of the week for running the trigger, and any discrepancies in the data that occur during particular days of the week, weeks of the month, and months of the year are determined. In some embodiments, a first group of similar triggers is compared to a second group of similar triggers. For example, a group of similar outbound transaction triggers may be compared to a group of similar inbound transaction triggers. In another example, automatic deposits that occur on Mondays may be compared to automatic deposits that occur on Fridays.

In block 514, the parameters associated with the similar triggers are modified in response to the evaluation of the one or more of the similar triggers over the same period of time. One or more of the parameters for a particular trigger can be added or removed and/or the terms of the parameters can be adjusted. Holidays and weekends, for example, may cause discrepancies in the preliminary trigger data and may be taken into account when defining the trigger. Even after the triggers are preliminarily established, the triggers may be continuously monitored on a regular basis as discussed in more detail below with regard to FIGS. 6a-6b.

In block 516, the triggers are categorized based at least on one of a desired objective, a type of transaction, a type of account, an amount threshold, and/or a period of time. In some embodiments, a first group of similar triggers and a different second group of similar triggers are categorized based on the desired objective. For example, ATM deposits may be categorized with payments for education if the purpose of the triggers is to offer the user a loan with a lower interest rate. The triggers categorized according to the desired objective are further categorized according to the type of transaction, the type of account, the amount threshold, and the period of time. In the example above, the ATM deposits used as triggers for the purpose of loan offers may be further categorized according to the amounts of the deposits. In block 518, the categorized triggers are monitored on a period basis, as discussed in further detail below with regard to FIGS. 6a-6b.

Figure 6A:
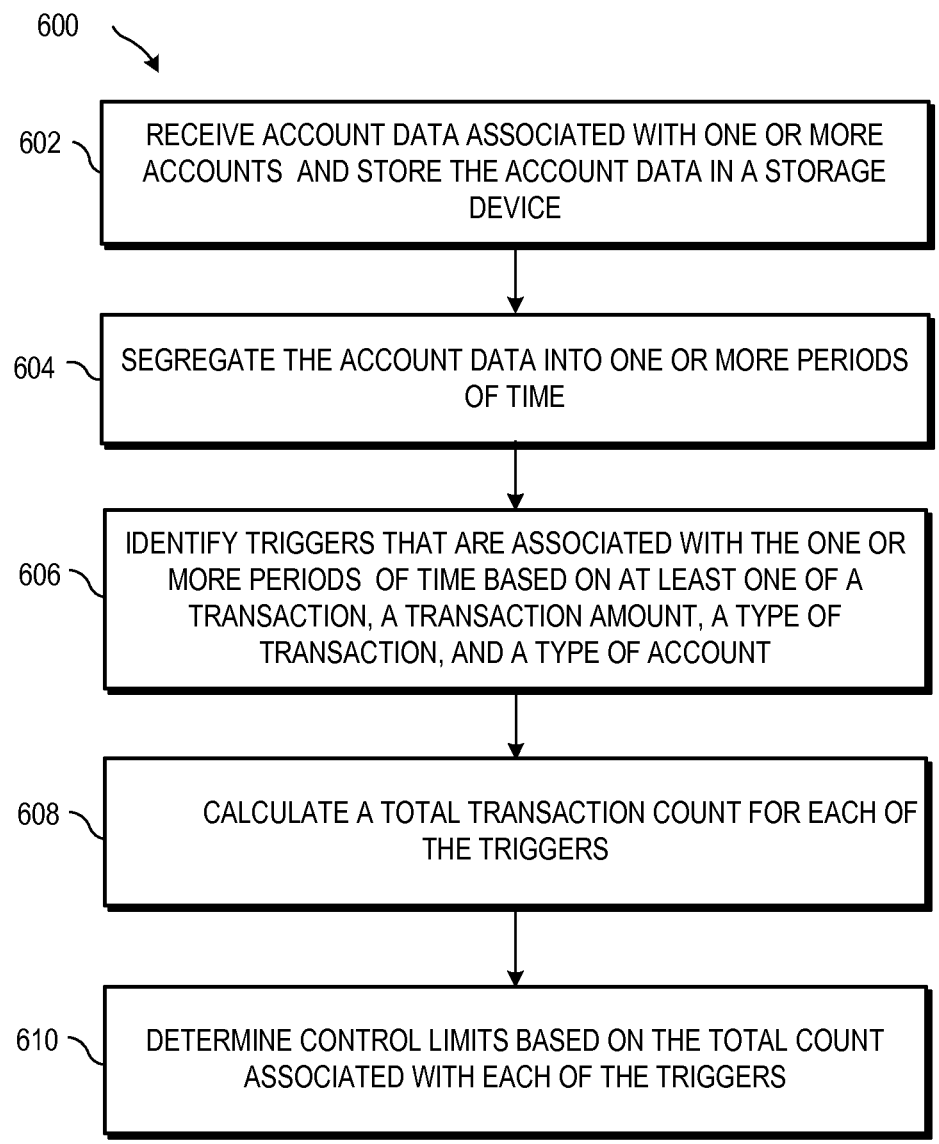
FIGS. 6A-6B are flowcharts illustrating a system and method for monitoring trigger data quality in accordance with various embodiments of the invention.
Figure 6B:
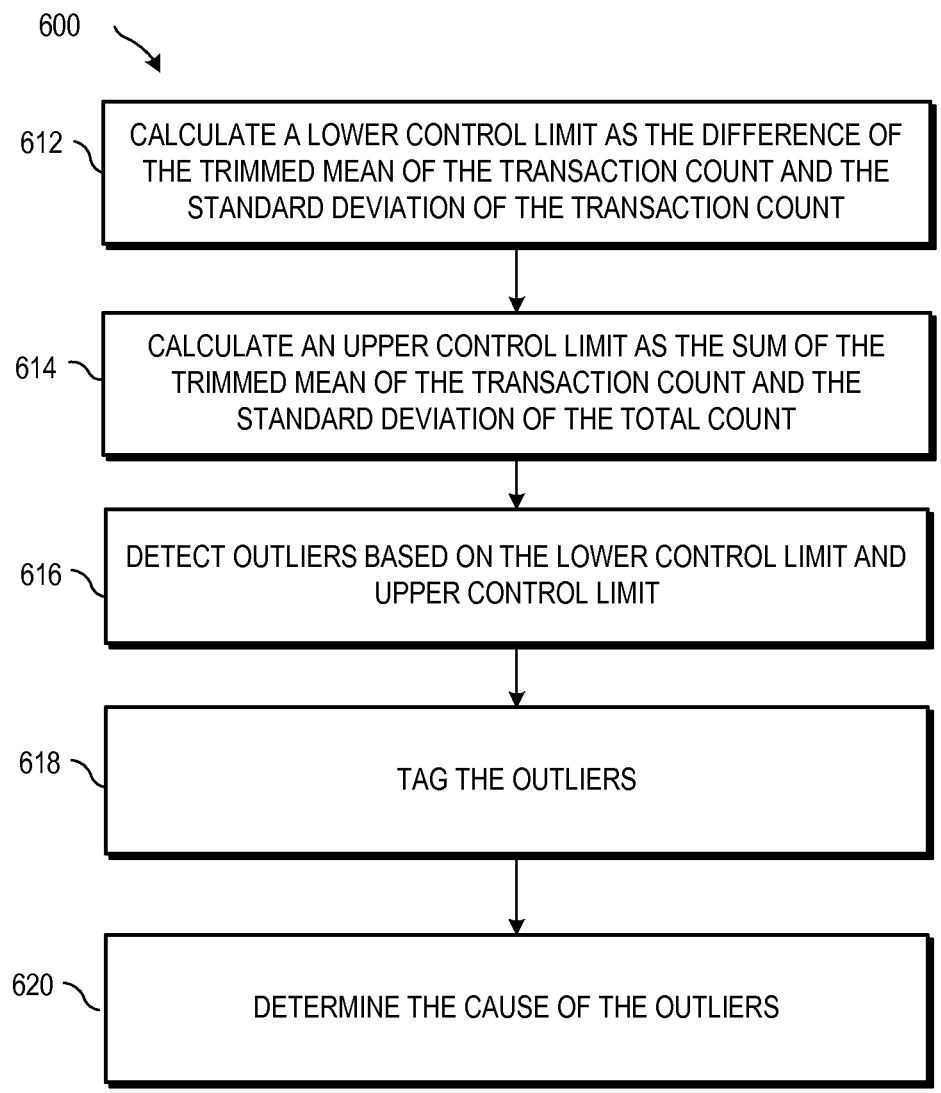

Referring now to FIGS. 6A-6B, flowcharts providing an overview of a system and method 600 for monitoring trigger data quality are provided. Because triggers have a very short life span, poor quality of data can lead to ineffective marketing and/or loss in revenue. The method 600 ensures that the right data is included in the triggers and detects potential definitional and process flaws in the triggers. The method 600 detects and reports whether the current trigger counts are normal or flawed in real time. The method 600 monitors the triggers to determine the accuracy, completeness, domain of values, and format of the trigger data. The triggers are further monitored to determine the relevance of the trigger metrics within a business context and explain how the metric score correlates to business performance. Also, the method 600 evaluates the soundness of all transformation processes, such as the categorization of the triggers.

In block 602 of FIG. 6A, account data associated with one or more accounts is received and stored in a storage device (e.g., the user account data repository 380 or the trigger repository 400). In block 604, the account data is segregated into one or more periods of time. For example, transactions may be divided into daily, weekly, monthly, quarterly, or yearly periods. The periods of time selected for segregating the account data are based on historical trends in the data. If deposits over $5,000 occurred only once per month over the last ten months, for example, then the data for such deposits would be segregated into monthly periods. By clustering data into specific time windows, seasonal, cyclic, and trend effects can be pinpointed as further discussed below with regard to FIG. 7A.

In block 606, triggers associated with the one or more periods of time are identified based on at least one of a transaction, a transaction amount, a type of transaction, and a type of account. In some embodiments, each set of triggers corresponding to transactions of a certain amount, and/or type are identified first and then the triggers are segregated into time periods. The triggers may be further identified based on a category corresponding to a desired objective. In some embodiments, the triggers are identified based on transactions that occur during the one or more periods of time. For example, a trigger may include all inbound transactions that have values that are greater than a threshold amount and that occur during the month of July.

In block 608, a total transaction count for each of the triggers is calculated. The transaction counts include value amounts for certain transactions associated with one or more accounts or the total number of certain transaction associated with the one or more accounts. In some embodiments, the transaction count is the total number of transactions that occur during the one or more period of time and that are associated with a particular trigger.

Figure 7A:
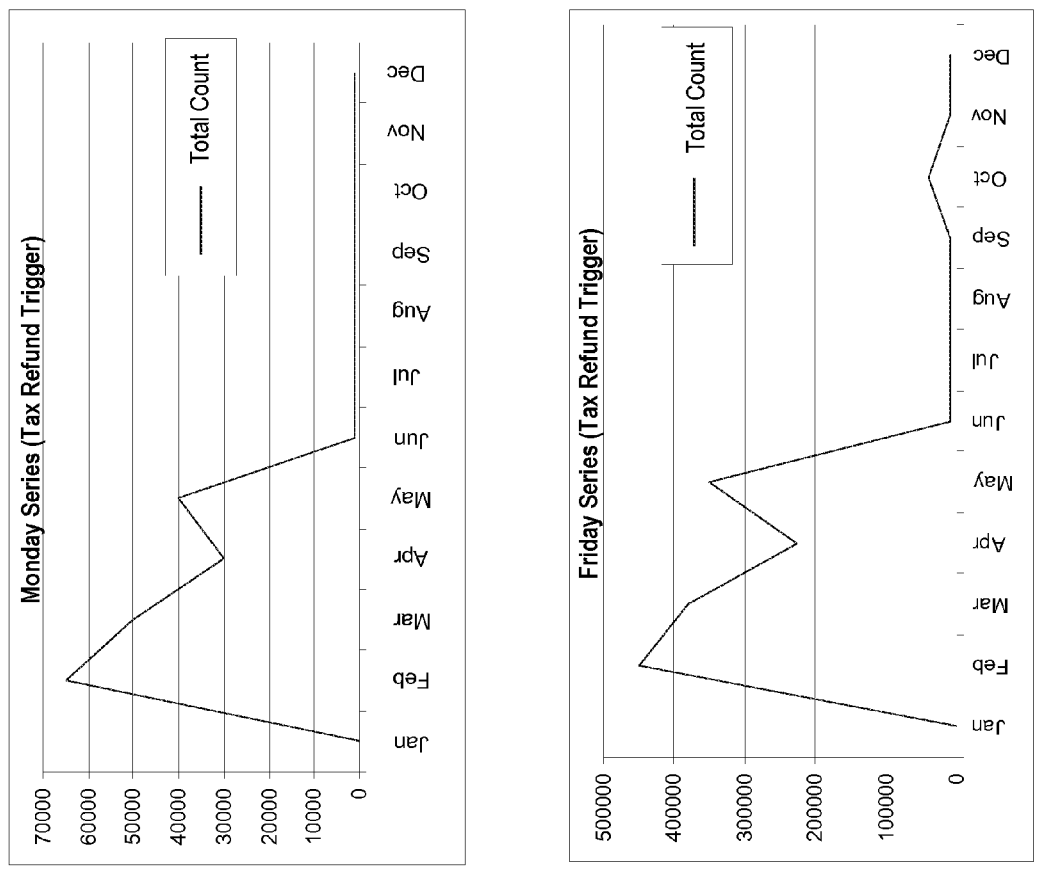
FIG. 7A provides graphical charts illustrating trigger data quality monitoring in accordance with various embodiments of the invention.

Exemplary graphical charts of total counts for a tax refund trigger are illustrated in FIG. 7A. In the Monday Series chart, the total transaction counts for the Mondays of every month of a particular year are charted. In the Friday Series chart, the total transaction counts for the Fridays of every month for the same particular year are charted. The data for Monday tax refunds can be compared to data for Friday tax refunds. The transaction counts for tax refund triggers during the months of February, March, April and May are much higher than the transaction counts for tax refunds during the rest of the year. And as shown in the Friday Series and Monday Series charts, the number of tax refunds is much higher on average for the Fridays in February to May than they are for the Mondays of the same period. Based on this data, the timing for sending users notifications of investment opportunities and product offers, for example, can be finely tuned such that the user receives offers at the most opportune times.

In block 610, control limits based on the transaction count for each of the triggers is determined. The control limits are calculated based on trimmed mean and standard deviation. Trimmed mean is calculated by removing a certain percent from the lowest percent of values and an equal certain percent from the highest percent of values in a given data series before calculating the mean. In calculating the trimmed mean, some of the lower numbers of the transaction count and some of the higher numbers of the transaction count are removed before the mean is calculated. For example, tax refund transactions that occur on a Friday and that have a value that is a certain percent higher or lower than the median for all tax refunds that occur on the same Friday are deleted before the mean is calculated.

FIG. 6B is a flowchart further illustrating the method and system 600. In block 612, a lower control limit is calculated as the difference of the trimmed mean of the transaction count and the standard deviation of the transaction count. In block 614, an upper control limit is calculated as the sum of the trimmed mean of the total count and the standard deviation of the total count. In block 616, outliers are detected based on the lower control limit and the upper control limit.

An exemplary table illustrating the transaction count and control limits is shown in FIG. 7B. The issue tracking table shows Trigger-1, Trigger-2, and Trigger-3, which are listed according to the date and the week day on which they occur. A lower control limit (LCL), a transaction count, and an upper control limit (UCL) are calculated daily for each trigger. The transaction count is the total number of transactions that occur for each of the Triggers 1-3 in a given day. Although a daily trigger data quality check is illustrated, it will be understood that the trigger check may be run on a weekly, monthly, or other time period basis. The LCL and UCL indicate whether a particular trigger is an outlier or a normal trigger. For example, Trigger-1 on Thursday, December 1 is tagged with an outlier alert based on the LCL and UCL numbers. The normal LCL for Trigger-1 on Thursday, December 8 is higher than the outlier LCL on December 1, and the normal UCL is lower than the outlier UCL on December 1. For triggers tagged as normal, the LCL and UCL remain constant from period to period. As shown in the table, normal Trigger-2 on Friday, December 2 and normal Trigger-2 on Friday, December 9 each has the same LCL and UCL numbers even though the total count for each day is different.

In block 618, the outliers are tagged. The outliers may be tagged as "outlier" as illustrated in the exemplary table of FIG. 7B or "fail" and suppressed automatically. In some embodiments, alerts are sent to analysts. For example, reports, graphs, tables, or other notifications may be sent to analysts for further processing. The analysts may decide to segregate, delete, modify, or retain the tagged or untagged trigger data. For example, one or more transactions associated with a particular trigger may be deleted and the transaction count recalculated for that particular trigger. In other embodiments, the triggers that exhibit a normal pattern and that are within confidence limits are tagged as "normal" or "pass."

In block 620, the cause of the outliers is determined. Periods of time around holidays, cyclic considerations such as tax season, days of the week, weeks of the month, certain historical trends can indicate the cause for the outliers, data obtained from the user, and external data. For example, historical trends may indicate that the number of mortgage payments is higher at the end of the month than at the beginning of the month and the number of ATM withdrawals may be higher on Fridays than it is on Tuesdays. As another example, triggers that include transactions having a specific threshold amount of $10 may have a higher number of transactions during a particular period because a greater number of low end transactions (e.g., transaction of $10 to $12) occur during that period. Based on the cause of the skewed data, appropriate action can be taken. For example, the threshold amount or some other parameter associated with the trigger may be modified or certain triggers associated with a particular day of the week or other period may be tagged as normal even though these certain triggers would appear to be abnormal. If the cause of the outliers is not easily explained or if it is unexpected, then further investigation may be required.

Figure 8:
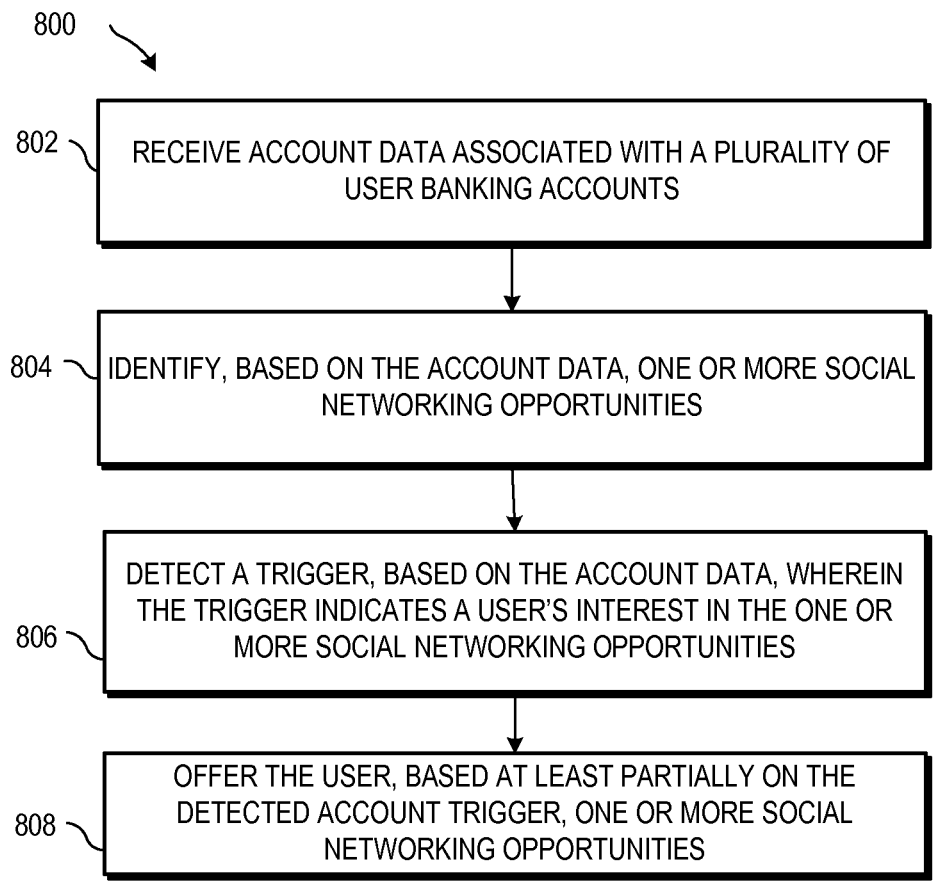
FIG. 8 is a flowchart illustrating a system and method for optimizing a social network.

FIG. 8 is a flowchart providing an overview of a system and method 800 for optimizing social networking. The system and method 800 provides a means for creating networking opportunities amongst individuals that would normally not come in contact.

In block 802, account data associated with a plurality of user accounts is received and the account data is stored in a storage device (e.g., the user account data repository 380 or the trigger repository 400). Account data may be received for a predetermined period. The predetermined period may be 3 months, 6 months, 12 months, 2 years and the like. The account data may include the transaction amount, transaction time, transaction location, and/or transaction category (e.g., leisure spending, educational spending, etc.). In some embodiments, the account data includes the account number or Merchant Category Code (MCC) of the party participating in the transaction with the user. In an exemplary embodiment, the transaction is a purchase of goods or services by the user, but the transaction may also be a deposit into the user's account (e.g., a rebate from a specific retailer), a transfer, a loan or guaranty, etc.

In block 804, one or more social networking opportunities are identified, based on the account data. Social networking opportunities may include, but not be limited to, study groups, sports leagues, business opportunities, hobbyist clubs and the like. In one embodiment, identifying one or more social networking opportunities may comprise analyzing a plurality of user accounts and identifying common transactions amongst the plurality of user accounts. In one embodiment, the common transaction may be associated with a trigger such that the trigger may be subsequently detected in any single users account data.

In additional embodiments of the claimed invention one or more social networking opportunities may be identified based on information received from a plurality of social networks. In such an embodiment, information about social networking opportunities may be received from one or more social networks and stored in a database. In such an embodiment, the system may identify one or more social networking opportunities, based on the account data and information received from one or more social networks. For example, the system may receive information from a local motorcycle club indicating they are looking for new club members. The system may then detect the purchase of a motorcycle in a plurality of user accounts and offer the users corresponding information about the local motorcycle club.

In a still further embodiment, one or more social networking opportunities may be identified from users or from businesses associated with the financial institution. For example, a user may desire to establish a club related to couponing. The user may be interested in meeting other like-minded individuals interested or already participating in couponing but have limited resources to find such individuals. The user may establish a social networking opportunity, such as a meeting, and provide the opportunity to the financial institution. In some embodiments, businesses associated with the financial institution may also provide social networking opportunities. For example, a business associated with cookware may offer a cooking class to interested individuals. The business may provide this social networking opportunity to the financial institution.

In some embodiments (not shown), one or more triggers associated with the social networking opportunity are determined. As discussed previously, historical transaction data may be reviewed to identify triggers for social networking opportunities. For example, transaction data may be reviewed to identify whether a trigger may be created or defined based on specific characteristics of the account data. Keywords or phrases in transaction parties may be identified, such as "education," "college prep," or "edu" to identify transactions that may be associated with networking opportunities. For example, education-related transactions may be determined to be triggers for a study group social networking opportunity. Triggers may be determined in a variety of ways. For example, merchant category code (MCCs) may identify parties associated with transactions and allow the system and method to categorize transactions and identify triggers for social networking opportunities. Additionally, recurrent transactions based on time and/or place may be identified to identify or determine triggers that are related to social networking opportunities. For example, a trigger may be determined based on identifying a subset of users that frequently or a minimum number of times conduct a transaction at the same general location and same general time. For example, a subset of users may be identified that conduct transactions at a bowling alley each week. The system may identify these users based on the triggers and provide the users an opportunity to join and/or form a bowling league at the bowling alley. The triggers may be determined by a financial institution or may be determined or supplemented by users and/or businesses. For example, a user may suggest keywords or payment recipients that are appropriate to determine a trigger, e.g., payment recipients that may be associated with a specific networking opportunity.

In block 806, one or more triggers are detected, based on the account data. The one or more triggers may indicate a user's interest in the one or more social networking opportunities identified. In block 808, one or more social networking opportunities are offered to the user, based at least partially on the detected trigger. For example the system and method 800 may detect the trigger relating to "College preparation" (SAT) in a plurality of user accounts and determine the user's may be interested in SAT preparation study groups. To this extent the system may offer the user's an invitation to an SAT study group. Offering one or more social networking opportunities may include, but not be limited to, offering invitations to social networks, sending information about social networks, offering contact exchange amongst one or more users, sending marketing materials associated with a social network and the like. In an embodiment, users opt into receive social networking opportunities or to share contact information.

In additional embodiments of the claimed invention, the system and method 800 determines, based on the account data, demographic information associated with a plurality of user accounts. In another embodiment, demographic information may be determined based on existing information provided by a user to a financial institution. Demographic information may include, but not be limited to race, age, sex, location, business type, household type and the like. As such, the system and method 800 may offer the user, based at least partially on the detected account trigger and user demographic information, one or more social networking opportunities. In such an embodiment, the system may detect a trigger related to the purchase of sports equipment and may offer the user information about sports leagues in their demographic area.

In additional embodiments of the claimed invention, the system and method 800 creates a social networking site, based at least partially on the one or more identified social networking opportunities. In one embodiment, the social networking site may facilitate the exchange of contact information amongst one or more users. In one embodiment, the system may offer the user an invitation to the social networking site. In further embodiments of the invention, the system may receive consent from the user to post their contact information to the social networking site.

In additional embodiment of the claimed invention, the system and method 800 may store user contact information in a database. The system may then associate the user contact information with a specific category within the database. The specific categories may be associated with networking opportunities such that a user, for which a related trigger was detected, may access the database and obtain contact information of a plurality of user's. For example, the database may contain a bowling category. The bowling category may include contact information for bowling alleys, bowling leagues, individual bowlers and the like. In another embodiment, the database may also comprise specific advertisements for networking opportunities related to a specific category.

In additional embodiments of the claimed invention, the system and method 800 may receive one or more requirements, for a social networking opportunity, from a social network such that a user may not be offered the social networking opportunity until the one or more requirements have been met. For example, an SAT study group may identify that at least twenty participants are needed in order to conduct the SAT study group. To this extent, the system and method 800 may not offer user's an invitation to the SAT study group until the trigger relating to "College preparation" (SAT) has been detected in at least twenty user accounts for a given demographic area.

In a still further embodiment, special offers such as discounts or sales may be offered to users associated with the social networking opportunity. For example, participants in a cooking class may be offered a discount on products sold by the business providing the social networking opportunity. In this manner, targeted offers may be provided to individuals that are known to be interested in a specific social networking opportunity.

The flowcharts and block diagrams in the Figures illustrate the architecture, functionality and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. An apparatus configured to optimize social networking by offering to users social networking opportunities determined based on a review of user financial account data and social networking opportunity data, the apparatus comprising:
    a non-transitory computer-readable storage medium including computer-readable program code stored therein;
    a processor operatively coupled to the computer readable storage medium and configured to execute the computer readable program code to:
        receive financial account data associated with a plurality of users' financial institution accounts;
        receive social networking account data associated with a plurality of users' social networking accounts;
        identify, based on the financial account data and the social networking account data, social networking opportunities for one or more of the users, wherein identifying the social networking opportunities comprises:
            monitoring transaction information associated with the users financial accounts and social network opportunities from the users social networking accounts, wherein the social network opportunities are associated with an individual or organization; and
            detecting a trigger indicating one or more user's interest in the social network opportunity by determining at least one transaction in a user's account that is associated with the individual or organization associated with the social network opportunity; and
        offer the user, based at least partially on the detected trigger, the identified social networking opportunities.

2. The apparatus of claim 1, wherein the processor is further configured to analyze, based on the financial account data, demographic information associated with the plurality of user's.

3. The apparatus of claim 2, wherein the processor is further configured to offer the user, based at least partially on the detected trigger and the demographic information, one or more networking opportunities.

4. The apparatus of claim 1, wherein the processor is further configured to create, based at least partially on the one or more identified social networking opportunities, a social networking site, wherein the social networking site facilitates the exchange of user contact information.

5. The apparatus of claim 4, wherein the processor is further configured to offer the user an invitation to the social networking site.

6. The apparatus of claim 4, where the processor is further configured to receive, from the user, consent to post user contact information on the social networking site.

7. The apparatus of claim 1, where the processor is further configured to receive one or more requirements from a social network such that the plurality of users may not be offered the social networking opportunity until the one or more requirements have been met.

8. A method for optimizing a social networking, the method comprising:
    providing a non-transitory computer-readable storage medium including computer-readable program code stored therein;
    providing a processor operatively coupled to the computer readable storage medium and configured to execute the computer readable program code to:
        receiving financial account data associated with a plurality of users' financial institution accounts;
        receiving social networking account data associated with a plurality of users' social networking accounts;
        identifying, based on the financial account data and the social networking account data, social networking opportunities for one or more of the users, wherein identifying the social networking opportunities comprises:

monitoring transaction information associated with the users financial accounts and social network opportunities from the users social networking accounts, wherein the social network opportunities are associated with an individual or organization; and detecting a trigger indicating one or more user's interest in the social network opportunity by determining at least one transaction in a user's account that is associated with the individual or organization associated with the social network opportunity; and offering the user, based at least partially on the detected trigger, the identified social networking opportunities.

9. The method of claim 8, further comprising analyzing, based on the financial account data, demographic information associated with the plurality of user's.

10. The method of claim 9, further comprising offering the user, based at least partially on the detected trigger and the demographic information, one or more networking opportunities.

11. The method of claim 8, further comprising creating, based at least partially on the one or more identified social networking opportunities, a social networking site, wherein the social networking site facilitates the exchange of user contact information.

12. The method of claim 11, further comprising offering the user an invitation to the social networking site.

13. The method of claim 11, further comprising receiving, from the user, consent to post user contact information on the social networking site.

14. The method of claim 8, further comprising receiving one or more requirements from a social network such that the plurality of users may not be offered the social networking opportunity until the one or more requirements have been met.

15. A computer program product comprising a non-transitory computer-readable medium, wherein the computer-readable medium comprises computer-executable program code portions stored therein, and wherein the computer-executable program code portions comprise:

a first program code portion operable to receive financial account data associated with a plurality of users' financial institution accounts;

a second program code portion operable to receive social networking account data associated with a plurality of users' social networking accounts;

a third program code portion operable to identify, based on the financial account data and the social networking account data, social networking opportunities for one or more of the users, wherein identifying the social networking opportunities comprises:

monitoring transaction information associated with the users financial accounts and social network opportunities from the users social networking accounts, wherein the social network opportunities are associated with an individual or organization; and detecting a trigger indicating one or more user's interest in the social network opportunity by determining at least one transaction in a user's account that is associated with the individual or organization associated with the social network opportunity; and a fourth program code portion operable to offer the user, based at least partially on the detected trigger, the identified social networking opportunities.

16. The computer program product of claim 15, further comprising:

a fifth program code portion operable to analyze, based on the financial account data, demographic information associated with the plurality of user's.

17. The computer program product of claim 16, wherein the fifth program code portion is further operable to:

offer the user, based at least partially on the detected trigger and the demographic information, one or more networking opportunities.

18. The computer program product of claim 15, further comprising:

a fifth program code portion operable to create, based at least partially on the one or more identified social networking opportunities, a social networking site, wherein the social networking site facilitates the exchange of user contact information.

19. The computer program product of claim 18, wherein the fifth program code portion is further operable to:

offer the user an invitation to the social networking site.

20. The computer program product of claim 18, wherein the fifth program code portion is further operable to:

receive, from the user, consent to post user contact information on the social networking site.

21. The computer program product of claim 15, further comprising:

a fifth program code portion operable to receive one or more requirements from a social network such that the plurality of users may not be offered the social networking opportunity until the one or more requirements have been met.

* * * * *